(No Model.)

A. P. LEWIS.
LOBSTER TRAP.

No. 524,331. Patented Aug. 14, 1894.

Witnesses:
Aurelia C. Percy
R. Bradford

Inventor:
Andrew Parker Lewis
By Payson, Virgin & Davis
his Attorneys.

(No Model.) 2 Sheets—Sheet 2.

A. P. LEWIS.
LOBSTER TRAP.

No. 524,331. Patented Aug. 14, 1894.

Witnesses:
Aurelia C. Percy

Inventor:
Andrew Parker Lewis
By Payson, Virgin & Davis
his Attorneys.

UNITED STATES PATENT OFFICE.

ANDREW PARKER LEWIS, OF DEER ISLE, ASSIGNOR TO WALTER G. DAVIS, CLINTON L. BAXTER, AND WILLIAM N. DAVIS, OF PORTLAND, MAINE.

LOBSTER-TRAP.

SPECIFICATION forming part of Letters Patent No. 524,331, dated August 14, 1894.

Application filed February 27, 1894. Serial No. 501,741. (No model.)

*To all whom it may concern:*

Be it known that I, ANDREW PARKER LEWIS, a citizen of the United States of America, residing at Deer Isle, in the county of Hancock and State of Maine, have invented certain new and useful Improvements in Lobster-Traps; and I do hereby declare that the following is a full, clear, and exact description of the invention, which will enable others skilled in the art to which it appertains to make and use the same.

My invention relates to improvements in lobster traps. These traps have heretofore been made of three arch shaped hoops, curved at the top and flat at the bottom, upon which are fastened thin slats, the whole forming an arch shaped cage. Heretofore each end of said trap has been closed by net work fastened to the edges and drawn inward forming a funnel terminating in an opening or mouth through which lobsters or other fish might enter the trap; the openings or mouths being placed directly or nearly opposite each other. A rope has usually been fastened to one end of the trap for the purpose of lowering it into and pulling it from the water, each trap while down having a stone or other weight fixed to its bottom. When such a trap is set, owing to the position and construction of the mouths or openings, the lobsters or other fish in it readily escape; and when such a trap is pulled, one end coming up first, the lobsters or other fish in it, tend to collect in the lower end, and escape through the mouth in that end.

To overcome the defects found in the traps in common use, and to prevent lobsters and other fish in a trap from escaping as readily as they do when caught in such a trap, I have constructed a trap, two forms of which are illustrated in the accompanying drawings.

Figure 1:
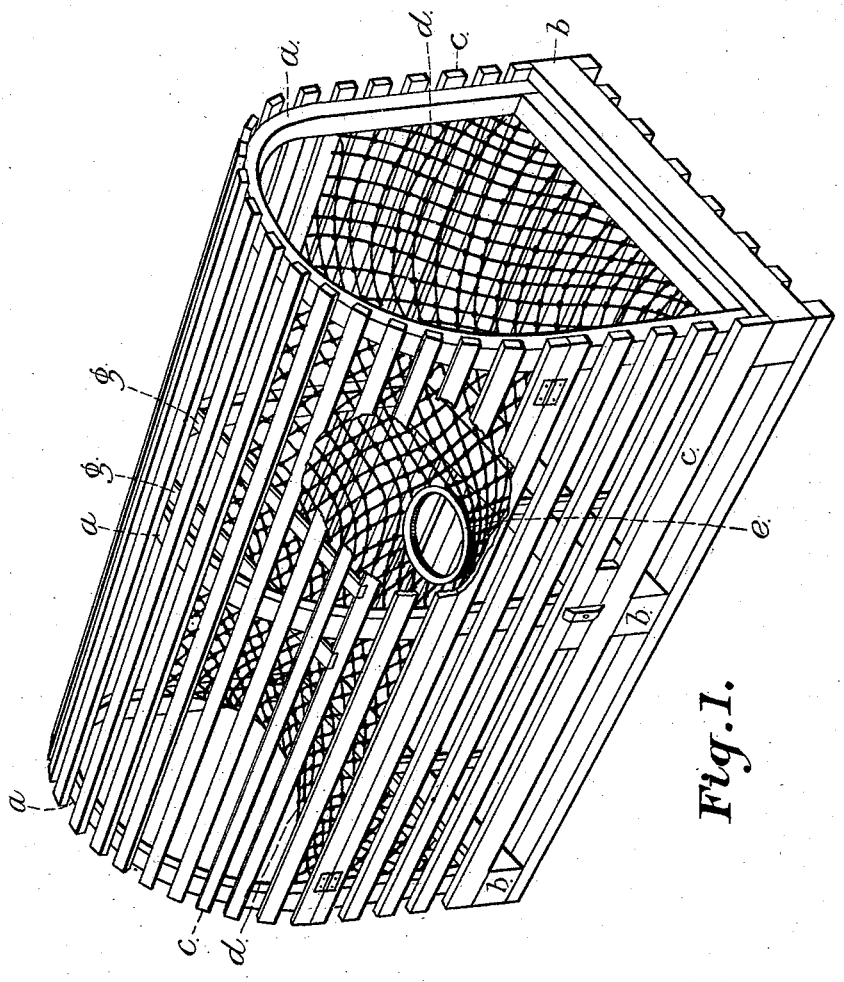
Figure 2:
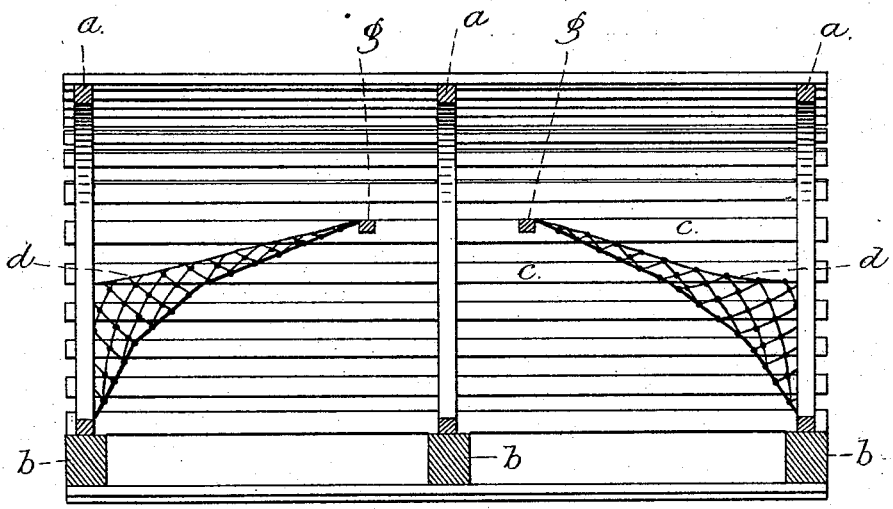
Figure 3:
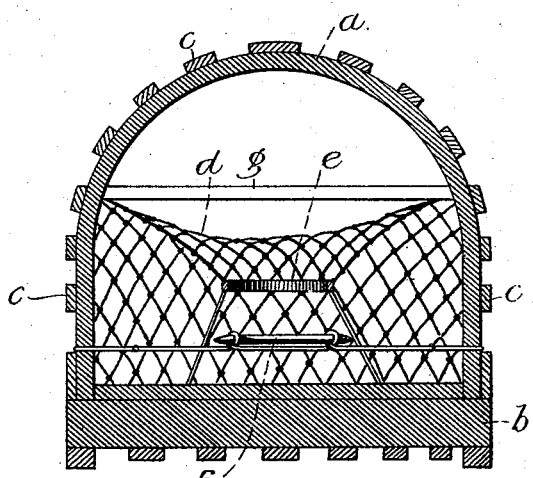

Figure 1. is a perspective view of a trap containing my improvements. Fig. 3. is a view of a cross section of a trap at the middle hoop, showing the diaphragm and mouth of the trap, and the bait spindle, the latter not being shown in Fig. 1. Fig. 2 is a view of a longitudinal section of a trap, showing a different arrangement of the diaphragm, but embodying the same improvement.

The outside of the trap is of the usual form, consisting of the curved strips $a\,a\,a$ with their ends fitted into the flat pieces $b\,b\,b$, forming the arch shaped hoops $a—b\ a—b\ a—b$, upon which said hoops are fastened thin slats, $c\,c\,c$ and others like them, the whole forming an arch shaped cage, the flat part being the bottom. From the lower edge of one end of said trap, Fig. 1, a continuous partition, or diaphragm, $d\,d$, preferably of net work, although it may be of lattice, slats, or other construction extends within the trap to the lower edge of the trap at the other end, the sides of the diaphragm being drawn up and fastened to the sides of the trap, forming a chamber underneath said diaphragm or partition, between it and the bottom of the trap, and an opening or passageway above said diaphragm or partition, between it and the top of said trap sufficiently large to admit of the entrance of the lobsters to the trap.

In the diaphragm $d\,d$, as shown, and about midway between the ends thereof is a funnel shaped mouth or opening, $e$, formed by stretching the diaphragm downward, as shown in the drawings, Fig. 1. the slats being cut away to show said mouth or opening, through which the lobsters or other fish can enter the trap. Underneath said mouth $e$, a bait spindle $f$ is suspended horizontally by a line stretched from side to side of the trap, see Fig. 3 but the bait may be placed in any position, or receptacle. Heretofore, bait spindles have been vertical, but I suspend the bait spindle horizontally, to make it more difficult of access to the lobsters, thus lessening the consumption of bait and effecting a saving in the amount of bait required.

I do not confine myself to the construction hereinbefore described; but said construction may be varied as can readily be conceived: for instance in one variation said trap may be constructed by extending a diaphragm as indicated in Fig. 2 in which the diaphragm $d\,d$ extends from each end of said trap to the transverse cross pieces $g\,g$, the sides of said diaphragm being drawn up and fastened to the sides of the trap, forming an oblong mouth or opening into said trap, with a chamber underneath said diaphragm, and a passageway above it. There may also be more than one mouth or opening to said trap.

When using the trap as constructed and shown in the said drawings, the slat next above the diaphragm on each side may be removed to facilitate the entrance of lobsters or other fish. The three slats next below the edge of the diaphragm may be fastened together, and connected by hinges or other suitable fastenings to serve as a gate or door to said trap.

When a trap, constructed as shown, is set, owing to the location of its mouth, and the general construction of the trap, lobsters or other fish therein, cannot escape so easily as from a trap in common use. Again when a trap constructed as shown is pulled the lobsters and other fish therein, tend to collect to the lower end, and being unable to find the mouth easily, escape with greater difficulty, than from the trap as commonly constructed.

What I claim, and desire to secure by Letters Patent, is—

1. In a lobster trap, a longitudinal partition or diaphragm extended within said trap and so attached to the sides and ends of said trap, as to form a chamber underneath said diaphragm, and an opening or passage-way through said trap above said diaphragm, said partition or diaphragm being provided with one or more mouths, or openings into said chamber, substantially as described.

2. In a lobster trap, a longitudinal partition or diaphragm within said trap attached to the sides and ends thereof, and extending from each end of said trap to respective transverse cross-pieces about mid-way from the ends, and near the top of said trap, forming a chamber underneath said partition or diaphragm, and a passage-way through said trap above said partition or diaphragm, with an opening or mouth into said chamber between said transverse cross-pieces, substantially as described.

In testimony that I claim the foregoing as my invention I have hereunto set my hand this 19th day of February, A. D. 1894.

ANDREW PARKER LEWIS.

In presence of—
WELFORD B. JONAH,
WILLIAM W. COSTIN.